United States Patent
Nagakura

(10) Patent No.: US 7,081,577 B2
(45) Date of Patent: Jul. 25, 2006

(54) ELECTRONIC METRONOME

(75) Inventor: Fumiyoshi Nagakura, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/854,866

(22) Filed: May 27, 2004

(65) Prior Publication Data

US 2004/0255756 A1 Dec. 23, 2004

(30) Foreign Application Priority Data

May 27, 2003 (JP) ............................. 2003-149266
May 27, 2004 (JP) ............................. 2004-157755

(51) Int. Cl.
*G09B 15/00* (2006.01)

(52) U.S. Cl. ........................................ 84/484

(58) Field of Classification Search ................. 84/484, 84/478, 477 R, 609, 615, 612
See application file for complete search history.

(56) References Cited

U.S. PATENT DOCUMENTS

2004/0099132 A1 * 5/2004 Parsons ....................... 84/730
2004/0250672 A1 * 12/2004 Moodie ....................... 84/636

FOREIGN PATENT DOCUMENTS

WO    WO 03/052528    * 1/2003    .................. 84/484

* cited by examiner

*Primary Examiner*—Kimberly Lockett
(74) *Attorney, Agent, or Firm*—Adams & Wilks

(57) ABSTRACT

An electronic metronome has a casing including a display portion for displaying a numerical value of a tempo, a sound emitting device for emitting a sound representing the tempo, a vibration device for generating a vibration representing the tempo, and a vibration level adjusting device for adjusting the stregth of the vibratrion. The vibration is used for notifying a tempo to a user, whereby the user can master a good sense of tempo efficiently without being affected by the surrounding environment. The electronic metronome prevents the phenomenon that if a user performs a musical piece specified with a slow tempo immediately after performing a musical piece specified with a fast tempo, the user may perform the piece at a faster tempo than the originally intended slow tempo.

13 Claims, 7 Drawing Sheets

ELECTRONIC METRONOME

BACKGROUND OF THE INVENTION

1. Field of the Invention

The present invention relates to an electronic metronome.

2. Description of the Related Art

Conventionally known is an electronic metronome in which means for causing a user to sense a tempo set at will by the user indicates the tempo by flashing an LED according to the set tempo, or notifies the tempo by a click sound outputted from a sound emitting device.

The conventional electronic metronome merely functions to light the LED or emit a click sound according to the set tempo. In the case where the user performs a plurality of musical pieces in a situation such as a concert, there may occur a phenomenon that if the user performs a musical piece specified with a slow tempo immediately after performing a musical piece specified with a fast tempo, the user may perform the piece at a faster tempo than an originally intended tempo. In order to prevent the phenomenon, a performer uses a metronome or the like to check the tempo for a performance in advance. However, it would definitely embarrass a professional performer to listen to the click sound using the conventional metronome on a stage.

SUMMARY OF THE INVENTION

According to an aspect of the present invention, there is provided an electronic metronome including a sound emitting portion for outputting a sound representing a tempo, a display portion for displaying a numerical value of the tempo, and a vibration outputting portion for outputting a vibration representing the tempo.

Herein, the vibration outputting portion may include a vibration portion that projects from an upper surface of a casing, a vibration source that is disposed on a lower surface of the vibration portion, and a switch that is disposed on the lower surface of the vibration portion and allows selection of when to start and stop a vibration of the vibration source based on depression of the vibration portion.

Herein, the vibration source may be an eccentric motor, and an axis of the eccentric motor may be arranged in parallel with an upper surface of the vibration portion. Further, the vibration source may have a cylindrical shape.

In the present invention, the vibration outputting portion can be connected to a casing including the sound emitting portion and the display portion via a cable.

According to another aspect of the present invention, there is provided an electronic metronome including a tempo/beat inputting portion for inputting a tempo and a beat, a control portion for outputting a sound signal and a vibration signal representing the tempo and the beat based on tempo/beat data inputted from the tempo/beat inputting portion, a sound outputting portion for outputting a sound based on the sound signal, and a vibration outputting portion for generating a vibration based on the vibration signal.

Herein, the electronic metronome may further include a vibration level adjusting portion for controlling a strength of the vibration generated from the vibration outputting portion based on a current level applied to the vibration outputting portion. Further, the tempo/beat inputting portion may include a terminal for inputting tempo information inputted from a tempo information generator connected to the electronic metronome from an outside.

Further, the present invention relates to an electronic metronome characterized by being equipped with a vibration device. The vibration device is provided to a surface of the casing of the electronic metronome. By touching the vibration device with a finger or the like, a user can sense an accurate tempo without a click sound being outputted.

By providing the vibration device independently of the casing of the electronic metronome, the vibration device can be placed in the vicinity of a performer, thereby allowing the performer to keep the audience unaware of his/her action of sensing the tempo.

The vibration device includes the adjustment device that allows adjustment of the strength of the vibration, so that the user can sense the tempo without being affected by the surrounding environment and the user's capability of sensing the vibration.

The vibration device is caused to vibrate simultaneously with the click sound outputted from the sound emitting device, thereby making it possible to sense the tempo by not only the sense of hearing but also the sense of touch. Accordingly, the user can train himself/herself to master a good sense of tempo with efficiency.

The vibration device outputs only the vibration independently even without the click sound being outputted. Accordingly, the user can train himself/herself to master a good sense of tempo even in the environment where it is difficult to check the tempo by outputting the click sound.

The vibration device allows selection of whether or not the vibration is to be outputted by use of a switching device such as a switch. Accordingly, the user can train himself/herself to master a good sense of tempo when necessary. Further, it can be selected whether or not the vibration is to be outputted by use of the switching device such as a switch, whereby the electrical power required for the operation of the vibration device can be suppressed to a minimum required value.

By integrating the vibration device with the switching device, the moment the switching device is operated, the user can sense the tempo through the vibration.

The vibration device is caused to vibrate constantly, so that during the operation of the metronome, the switching device such as a switch does not need to be operated each time the metronome is used. Therefore, the inconvenience of operating the switching device can be eliminated.

DETAILED DESCRIPTION OF THE PREFERRED EMBODIMENTS

Figure 1:
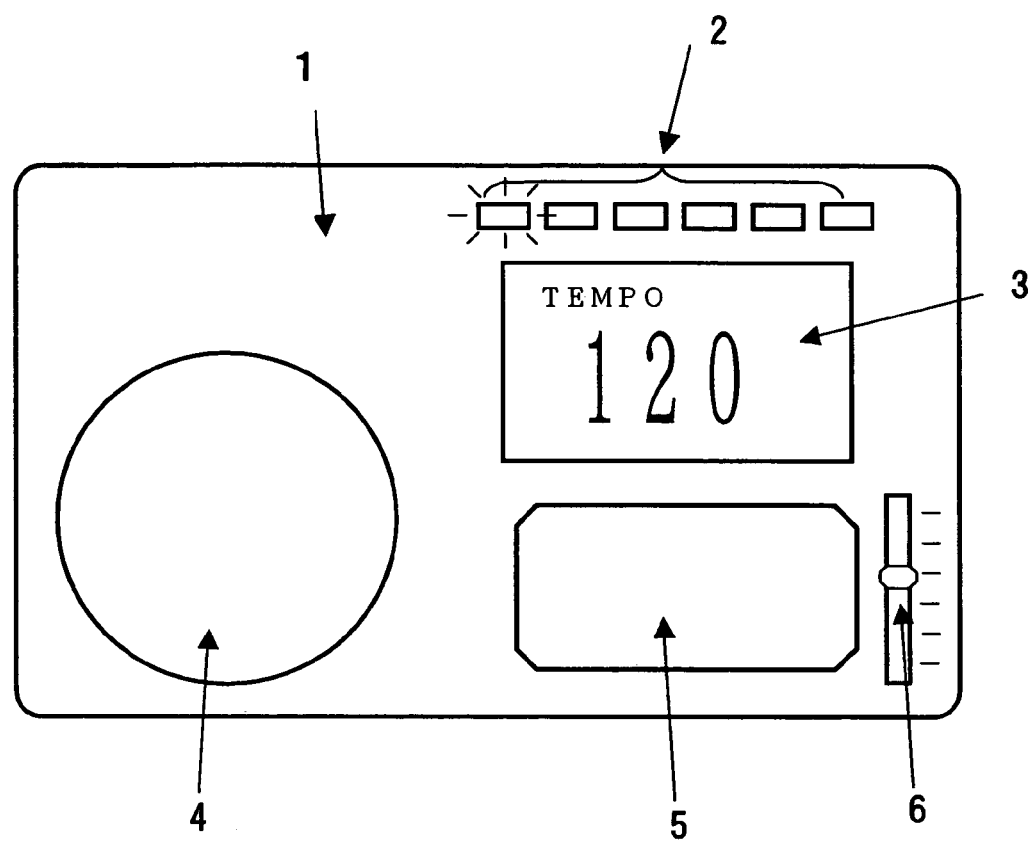
FIG. 1 is a top view of an electronic metronome showing an embodiment of the present invention.

In FIG. 1, a casing 1 of an electronic metronome includes a tempo displaying LED portion 2 for indicating a tempo, a display portion 3 for displaying a numerical value of the tempo, a sound emitting device 4 for emitting a sound representing the tempo, and a vibration device 5 for generating a vibration representing the tempo. The tempo set by a user is displayed on the display portion 3, and the tempo is indicated by a state where LEDs lined in the tempo displaying LED portion 2 are lit so as to have the lit LED reciprocate. Similarly, the sound emitting device 4 outputs a click sound based on the set tempo, and the vibration device 5 vibrates in synchronization with the click sound. A vibration strength adjusting volume 6 is used to adjust the strength of the vibration generated by the vibration device 5.

Figure 2:
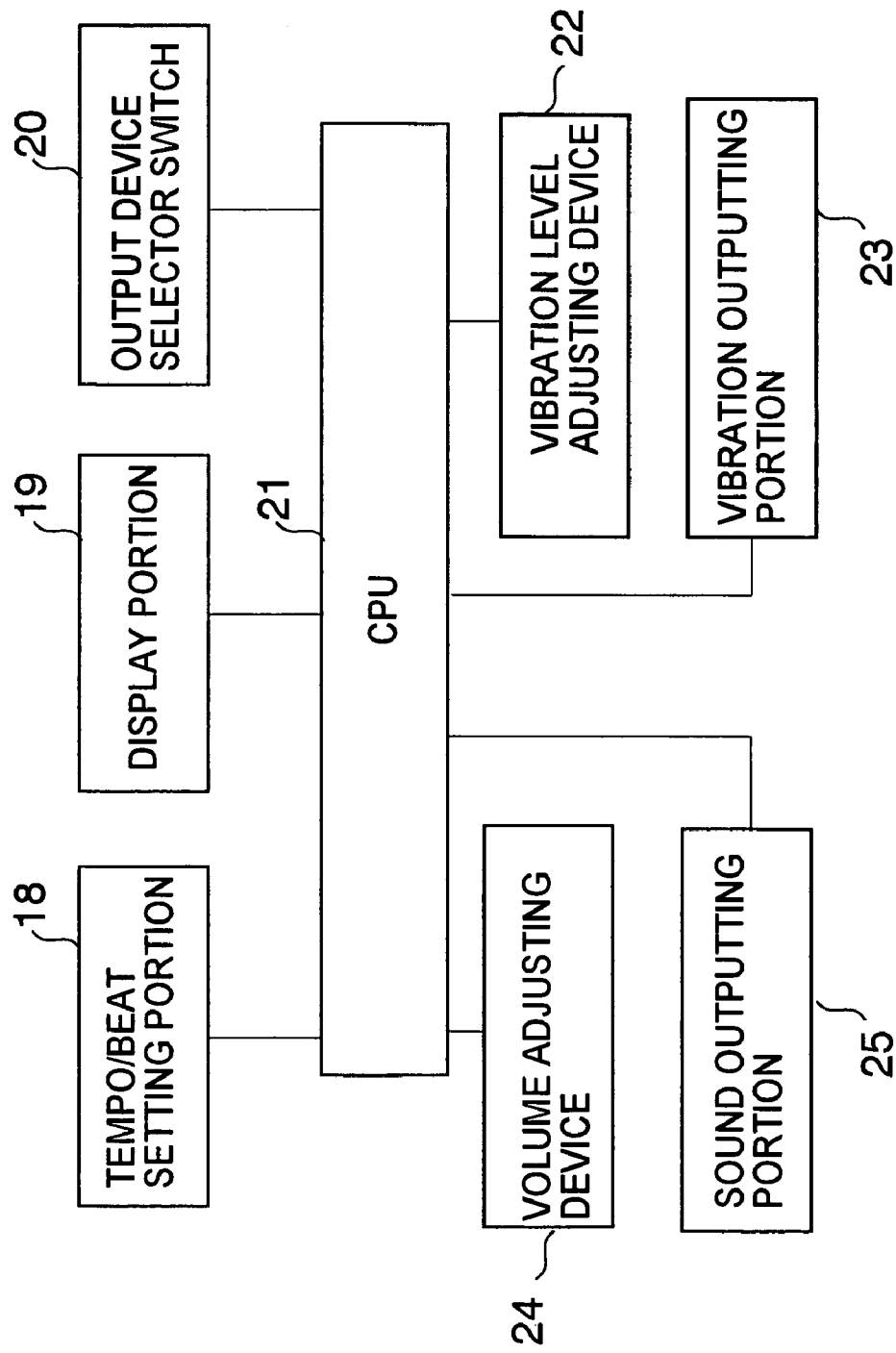
FIG. 2 is a circuit diagram of the electronic metronome showing the embodiment of the present invention.

FIG. 2 is a block diagram showing a configuration example of the electronic metronome according to the present invention. Tempo and beat information inputted and set by a tempo/beat setting portion 18 is computed by a control portion such as a CPU 21, and the tempo information is displayed on an LCD of a display portion 19 and also displayed by lit and unlit states of an LED of the display portion 19 based on the set tempo. An output device selector switch 20 allows selection of whether an output is made from a vibration outputting portion 23 (vibration device 5) or a sound outputting portion 25 (sound emitting device 4). The vibration outputting portion 23 vibrates in response to a signal from the CPU 21. The strength of the vibration outputting portion 23 can be adjusted by a vibration level adjusting device 22. The sound outputting portion 25 outputs a sound in response to a signal from the CPU 21. The volume of the sound outputting portion 25 can be adjusted by a volume adjusting device 24.

Figure 3:
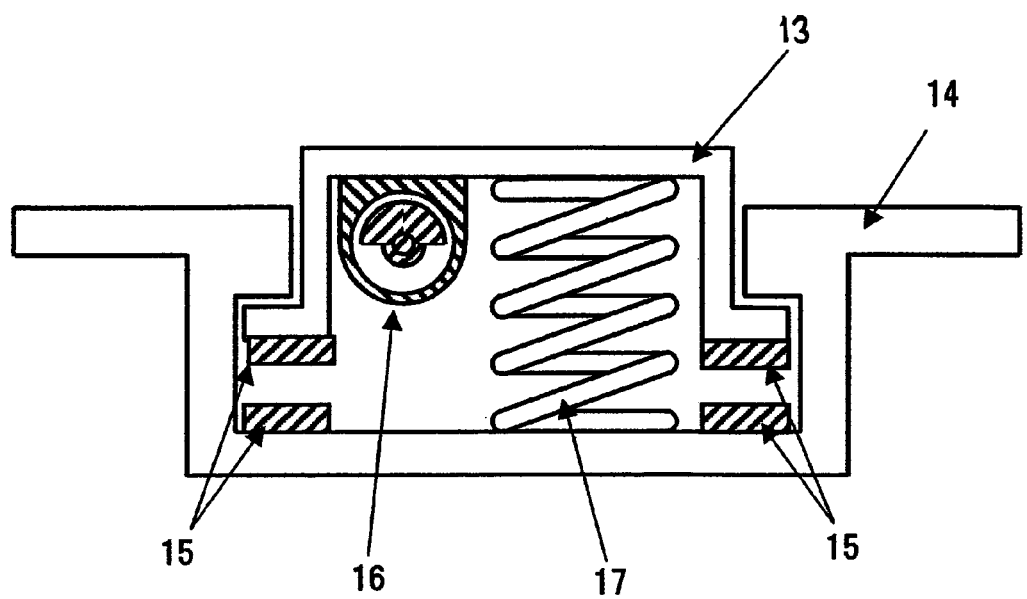
FIG. 3 is a sectional view of a vibration outputting portion showing the embodiment of the present invention.

FIG. 3 shows a structure of the vibration device 5 (vibration outputting portion 23). A vibration source 16 for generating a vibration continuously or intermittently is fixed to a rear surface of a depressible vibration portion 13. As a fixing method therefore, adhesion, welding, or the like is used. A pair of contacts 15 are provided to a lower surface of an outer peripheral portion of the vibration portion 13 and a bottom portion of a recessed portion of a casing 14, and operates as a switch by depressing the vibration portion 13. The switch is used to change over on and off states of the vibration source 16. In addition, the vibration portion 13 is supported by a spring 17 and has a repulsive force sufficient to allow the vibration portion 13 to recover an original position after depressed as the switch. Note that the vibration source 16 is provided by attaching an eccentric weight to a motor, but is not limited thereto, and any motor may be used as far as it can rotate at a predetermined rpm and allows a change in rpm. Further, the vibration source 16 is not limited to a rotary motor, but any motor can be used as far as it generates a vibration. A piezoelectric vibrator, a vibrating member for reciprocating a weight, or the like can be used as far as it generates a vibrating motion continuously or intermittently.

Figure 4:
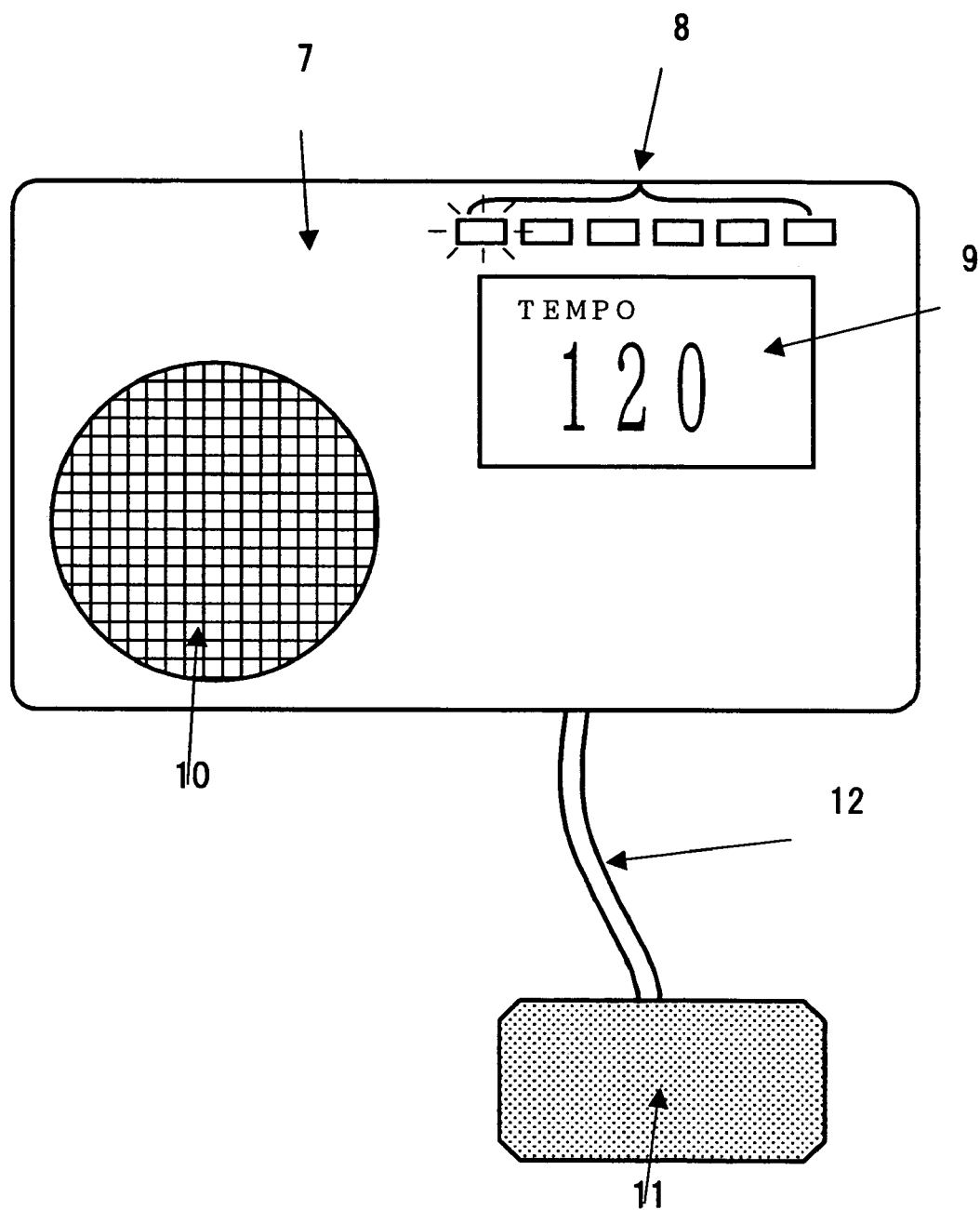
FIG. 4 is a top view of an electronic metronome showing another embodiment of the present invention.

Next, description will be made of another embodiment of the present invention. In FIG. 4, a casing 7 of an electronic metronome includes a tempo displaying LED portion 8, a tempo displaying portion 9, and a sound emitting device 10. A vibration device (vibration outputting portion ) 11 is independent of the casing 7 and is electrically connected to a control portion, such as a CPU, inside the casing 7 via a cable 12. Note that the vibration device 11 itself functions as a switch and can change over the on and off states of the vibration device 11.

Figure 5:
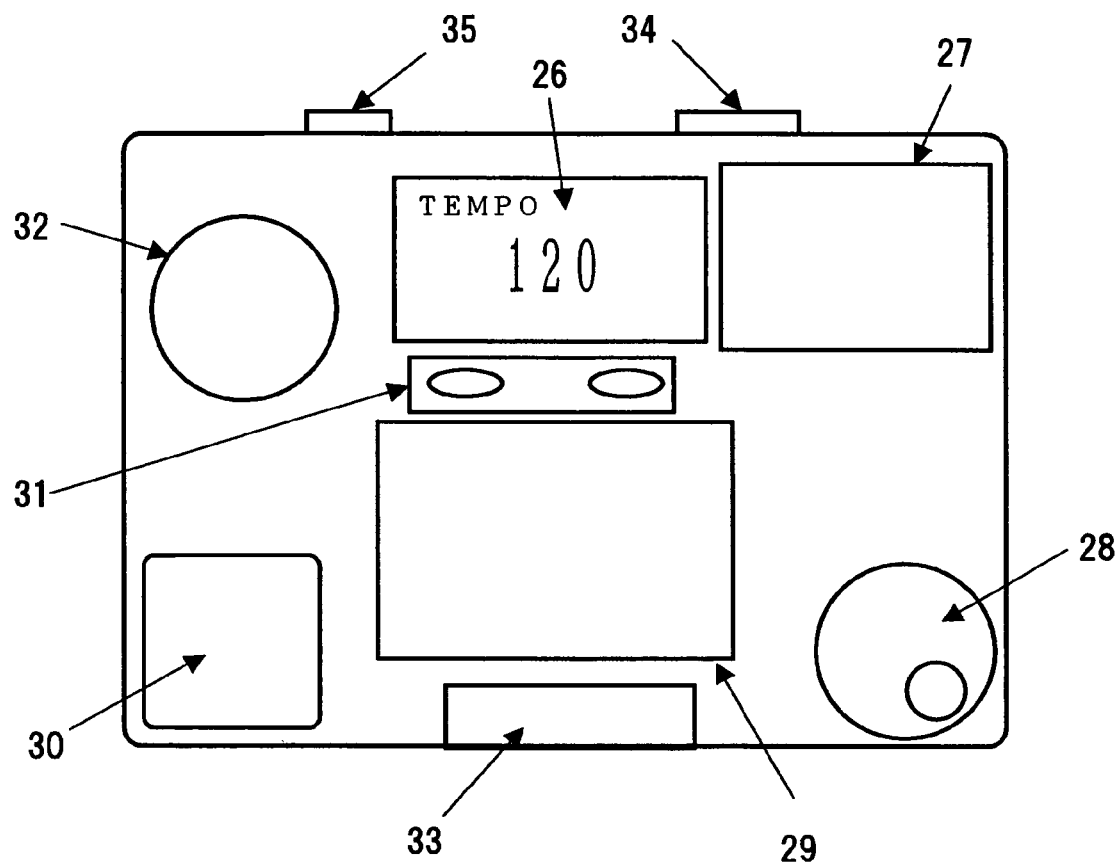
FIG. 5 is a top view of an electronic metronome showing further another embodiment of the present invention.

FIG. 5 shows further another embodiment of the present invention. A display portion 26 displays information including a tempo, a beat, and a function which are set by a tempo setting dial 28 or a function switch with ten keys 29. The tempo set by the tempo setting dial 28 or the function switch with ten keys 29 is outputted as a click sound from a speaker 32. An LED portion 31 is composed of two LEDs. One LED flashes in synchronization with a click sound of a down beat, and the other LED flashes in synchronization with a click sound of an up beat. The volume of the click sounds outputted from the speaker 32 can be adjusted by an adjustment volume 27. The adjustment volume 27 is provided with a plurality of beats, and a user can adjust the beat to a desired one as necessary and listen to the adjusted beat. In addition, the adjustment volume 27 allows adjustment of the strength of a vibration device 30. When a knob of the adjustment volume 27 is set to a minimum position, the volume of a beat sound becomes zero, thereby making the beat sound muted. Note that the adjustment volume 27 has types including a slider type and a rotary type. The vibration device 30 is laid out on a left side portion of a product, which is convenient for a user such as a drummer in that, for example, a right-handed drummer can hit the drum with a stick 36 in the right hand while touching the vibration device 30 with the left hand to sense the vibration, and can use the product without visual information displayed on the display portion 26, the LED portion 31, and the like being covered when the vibration device 30 is touched.

Figure 6:
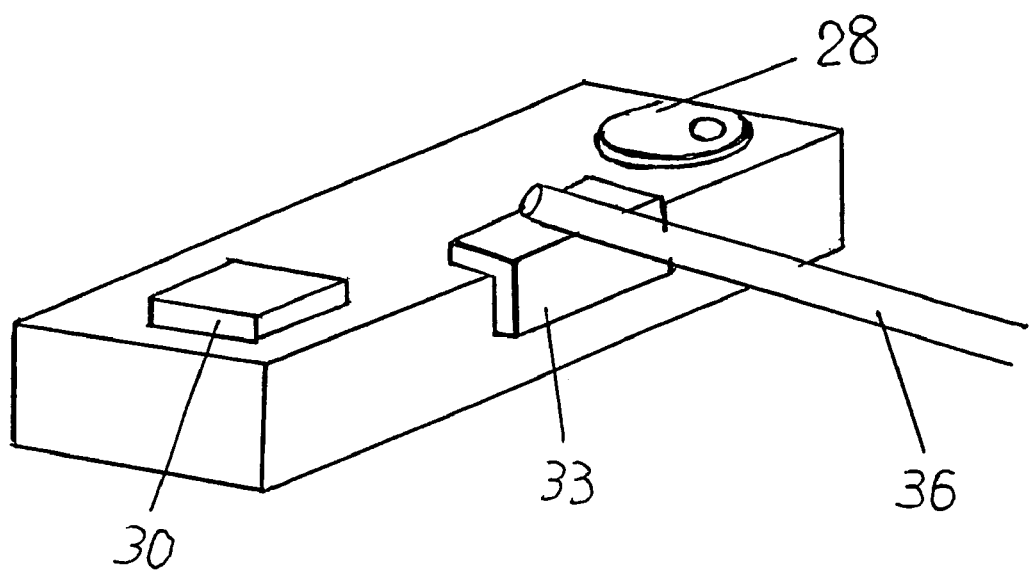
FIG. 6 is a perspective view of part of the electronic metronome shown in FIG. 5.

FIG. 6 is a diagram showing an example of how the electronic metronome according to the present invention is used. In FIG. 6, a start/stop button 33 is formed to be larger than other buttons and to have a shape that covers not only a top surface of the product but also a side surface thereof, thereby making it easy for the user such as a drummer to operate the start/stop button 33 even with the stick 36 and making it hard to damage the product. The product has a MIDI jack 34 equipped to the side surface, and by having the MIDI jack 34 connected to an external MIDI equipment, can measure tempo information outputted by a sequencer as the external MIDI equipment and display a measurement as the tempo on the display portion 26. By depressing the start/stop button 33 after the measurement, the click sound is outputted from the speaker 32 in synchronization with the external MIDI equipment, and the LED portion 31 flashes in synchronization therewith. The tempo information obtained from the measurement is effective even after disconnection from the external MIDI equipment. A trigger terminal 35 is connected to an external trigger device, and receives an input of a trigger signal, thereby allowing the external trigger device to be used as having the same function as the start/stop button 33.

Figure 7:
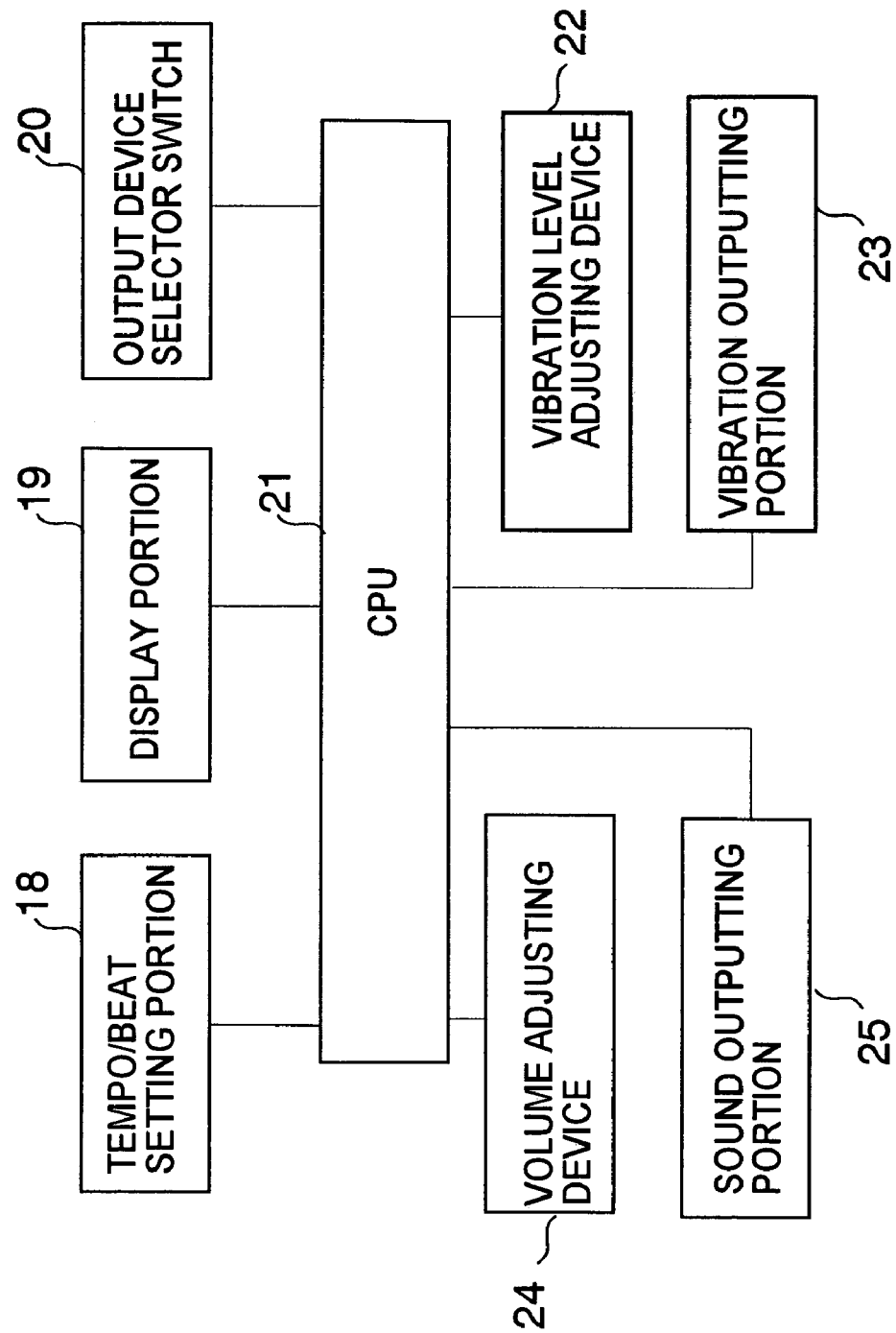
FIG. 7 is a circuit diagram of the electronic metronome showing still further another embodiment of the present invention.

FIG. 7 is a circuit block diagram showing still further another embodiment of the present invention. In FIG. 7, the strength of the vibration from the vibration outputting portion 23 is adjusted independently by the vibration level adjusting device 22. The vibration level adjusting device controls the strength of the vibration based on a current applied to the vibration outputting portion 23. The CPU 21 outputs information including a tempo and a beat to the vibration outputting portion 23 independently of the vibration level adjusting device 22.

As has been described in the embodiments above, the electronic metronome is equipped with the vibration device according to the present invention. Accordingly, a user can train himself/herself to master a good sense of tempo more effectively through a vibration in addition to conventional notifications using a click sound and light of an LED. By touching the vibration device with the finger or the like, the user can sense the tempo without the click sound being outputted. Accordingly, the user can train himself/herself to master a good sense of tempo while keeping others unaware of his/her training.

By providing the vibration device independently of the casing of the electronic metronome, the vibration portion can be placed in the vicinity of the user, which is advantageous in that the user does not appear to be using the electronic metronome. Since the casing does not include the vibration portion, there is another advantage in that the equipment can be downsized.

The vibration device includes the adjustment device that allows adjustment of the strength of the vibration, so that the user can train himself/herself to master a good sense of tempo at a desired strength without being affected by the use environment. The click sound is outputted from the sound emitting device simultaneously with the vibration with vibration device, thereby making it possible to sense the tempo by both the sense of hearing and the sense of touch. Accordingly, the user can train himself/herself to master a good sense of tempo with more efficiency.

The vibration device can output only the vibration independently. Accordingly, the user can train himself/herself to master a good sense of tempo even in the environment where quiet surroundings make it difficult to check the tempo by outputting the click sound.

The vibration device can have the on and off states changed over by the switch to there by be vibrated only when necessary. Thus, the power consumption can be suppressed to a minimum required value.

By integrating the vibration device with the switching device, the equipment can be downsized, and at the same time, can have the vibration portion vibrated with efficiency.

The vibration device is caused to vibrate constantly, thereby eliminating the operational inconvenience in which each time the user intends to use the metronome, the switch must be depressed to start the operation.

What is claimed is:

1. An electronic metronome, comprising:
   a sound emitting portion for outputting a sound representing a tempo;
   a display portion for displaying a numerical value of the tempo; and
   a vibration outputting portion for outputting a vibration representing the tempo, the vibration outputting portion comprising a depressible vibration portion, a vibration source disposed on a lower surface of the vibration portion, and a switch disposed on the lower surface of the vibration portion and to allow selection of when to start and stop a vibration of the vibration source based on depression of the vibration portion.

2. An electronic metronome according to claim 1; wherein the vibration source comprises an eccentric motor whose axis of rotation is parallel with an upper surface of the vibration portion.

3. An electronic metronome according to claim 1; wherein the vibration source has a cylindrical shape.

4. An electronic metronome according to claim 1; wherein the vibration outputting portion is electrically connected by a cable to a control portion.

5. An electronic metronome, comprising:
   a tempo/beat inputting portion for inputting a tempo and a beat;
   a control portion for outputting a sound signal and a vibration signal representing the tempo and the beat based on tempo/beat data inputted from the tempo/beat inputting portion;
   a sound outputting portion for outputting a sound based on the sound signal;
   a vibration outputting portion for generating a vibration based on the vibration signal; and
   a vibration level adjusting portion for controlling a strength of the vibration generated from the vibration outputting portion based on a current level applied to the vibration outputting portion.

6. An electronic metronome, comprising:
   a tempo/beat inputting portion for inputting a tempo and a beat, the tempo/beat inputting portion having a terminal for connectingr a tempo information generator located outside the electronic metronome to the electronic metronome and for inputting tempo information outputted from a the tempo information generator to the electronic metronome;
   a control portion for outputting a sound signal and a vibration signal representing the tempo and the beat based on tempo/beat data inputted from the tempo/beat inputting portion;
   a sound outputting portion for outputting a sound based on the sound signal; and
   a vibration outputting portion for generating a vibration based on the vibration signal.

7. An electronic metronome, comprising: a sound emitting device for outputting a sound representing a tempo; a display for displaying a numerical value of the tempo; and a vibration device for outputting a vibration representing the tempo, the vibration device comprising a depressible vibration member mounted to undergo vibration, a vibration source connected to the vibration member for vibrating the vibration member, and a switch responsive to depression of the vibration member for stopping vibration of the vibration member by the vibration source.

8. An electronic metronome according to claim 7; wherein the switch has a fixed first contact and a movable second contact connected to the vibration member for movement therewith, and depression of the vibration member brings the second contact into contact with the first contact to stop vibration of the vibration member by the vibration source.

9. An electronic metronome according to claim 7; further including a tempo/beat inputting portion for inputting a tempo and a beat; and a control portion for outputting to the sound emitting device a sound signal representing the tempo and the beat based on tempo/beat data inputted from the tempo/beat inputting portion and for outputting to the vibration device a vibration signal representing the tempo and the beat based on tempo/beat data inputted from the tempo/beat inputting portion.

10. An electronic metronome according to claim 9; wherein the tempo/beat inputting portion has a terminal for connection to a tempo information generator located outside the electronic metronome to enable tempo information outputted from the tempo information generator to be inputted to the electronic metronome.

11. An electronic metronome according to claim 7, further including a casing containing the sound emitting device, the display and the vibration device; wherein the depressible vibration member of the vibration device is mounted on the casing to undergo depression.

12. An electronic metronome according to claim 11; wherein the switch has a first contact fixed to the casing and a second contact connected to the vibration member for movement therewith, and depression of the vibration member brings the second contact into contact with the first contact to stop vibration of the vibration member by the vibration source.

13. An electronic metronome according to claim 7; further including a control portion for outputting a sound signal representing the tempo to the sound emitting device and for outputting a vibrating signal representing the tempo to the vibration device; a casing containing the sound emitting device, the display and the control portion; and a cable electrically connecting the vibration device to the control portion.

* * * * *